Figure 1:
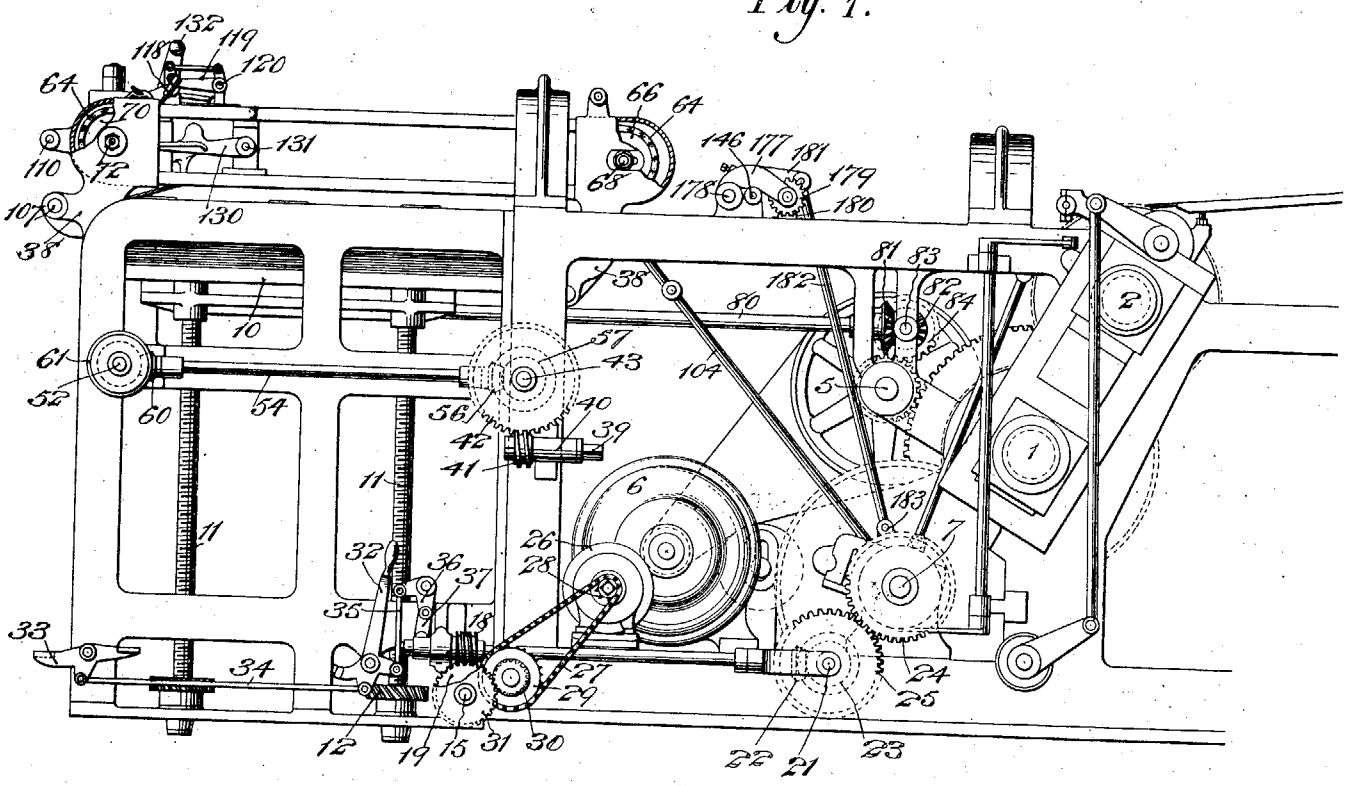

H. M. BARBER.

SHEET DELIVERY APPARATUS FOR PRINTING MACHINES.

APPLICATION FILED JULY 30, 1914.

Reissued Dec. 22, 1914.

13,850.

8 SHEETS—SHEET 1.

Witnesses:
Henry C. Thieme
H. George Berry

Inventor
Howard M. Barber
By his Attorneys Brown & Seward

H. M. BARBER.

SHEET DELIVERY APPARATUS FOR PRINTING MACHINES.

APPLICATION FILED JULY 30, 1914.

Reissued Dec. 22, 1914.

13,850.

8 SHEETS—SHEET 2.

Witnesses:
Henry B. Sieme
F. George Kerry

Inventor
Howard M. Barber
By his Attorneys Brumbaugh

H. M. BARBER.

SHEET DELIVERY APPARATUS FOR PRINTING MACHINES.

APPLICATION FILED JULY 30, 1914.

Reissued Dec. 22, 1914. 13,850.

8 SHEETS—SHEET 3.

Witnesses
Henry C. Thieme
F. George Berry

Inventor
Howard M. Barber
By his Attorneys Brown & Howard

H. M. BARBER.

SHEET DELIVERY APPARATUS FOR PRINTING MACHINES.

APPLICATION FILED JULY 30, 1914.

Reissued Dec. 22, 1914.

13,850.

8 SHEETS—SHEET 4.

Witnesses
Henry C. Theine.
F. George Barry

Inventor
Howard M. Barber
By his Attorneys Brown & Howard

H. M. BARBER.
SHEET DELIVERY APPARATUS FOR PRINTING MACHINES.
APPLICATION FILED JULY 30, 1914.
Reissued Dec. 22, 1914.
13,850.
8 SHEETS—SHEET 5.
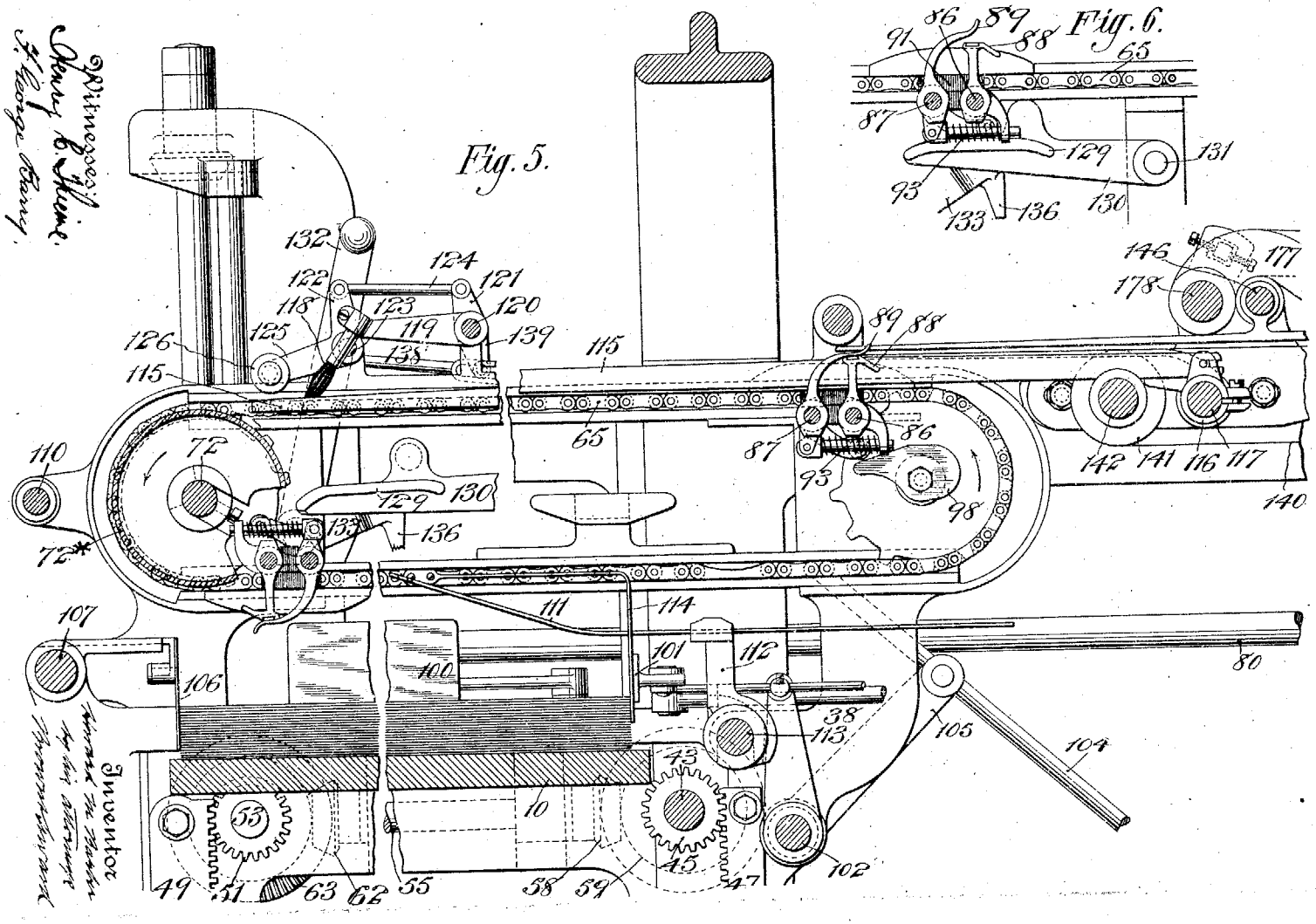
Witnesses:
Henry B. Thieme.
F. George Barry.
Inventor
Howard M. Barber
by his Attorneys
Thomas & Howard

H. M. BARBER.

SHEET DELIVERY APPARATUS FOR PRINTING MACHINES.

APPLICATION FILED JULY 30, 1914.

Reissued Dec. 22, 1914.

13,850.

8 SHEETS—SHEET 6.

Witnesses:
Henry C. Theine.
F. George Barry

Inventor
Howard M. Barber
By his Attorneys Brown & Brand

H. M. BARBER.
SHEET DELIVERY APPARATUS FOR PRINTING MACHINES.
APPLICATION FILED JULY 30, 1914.
Reissued Dec. 22, 1914.
13,850.
8 SHEETS—SHEET 7.
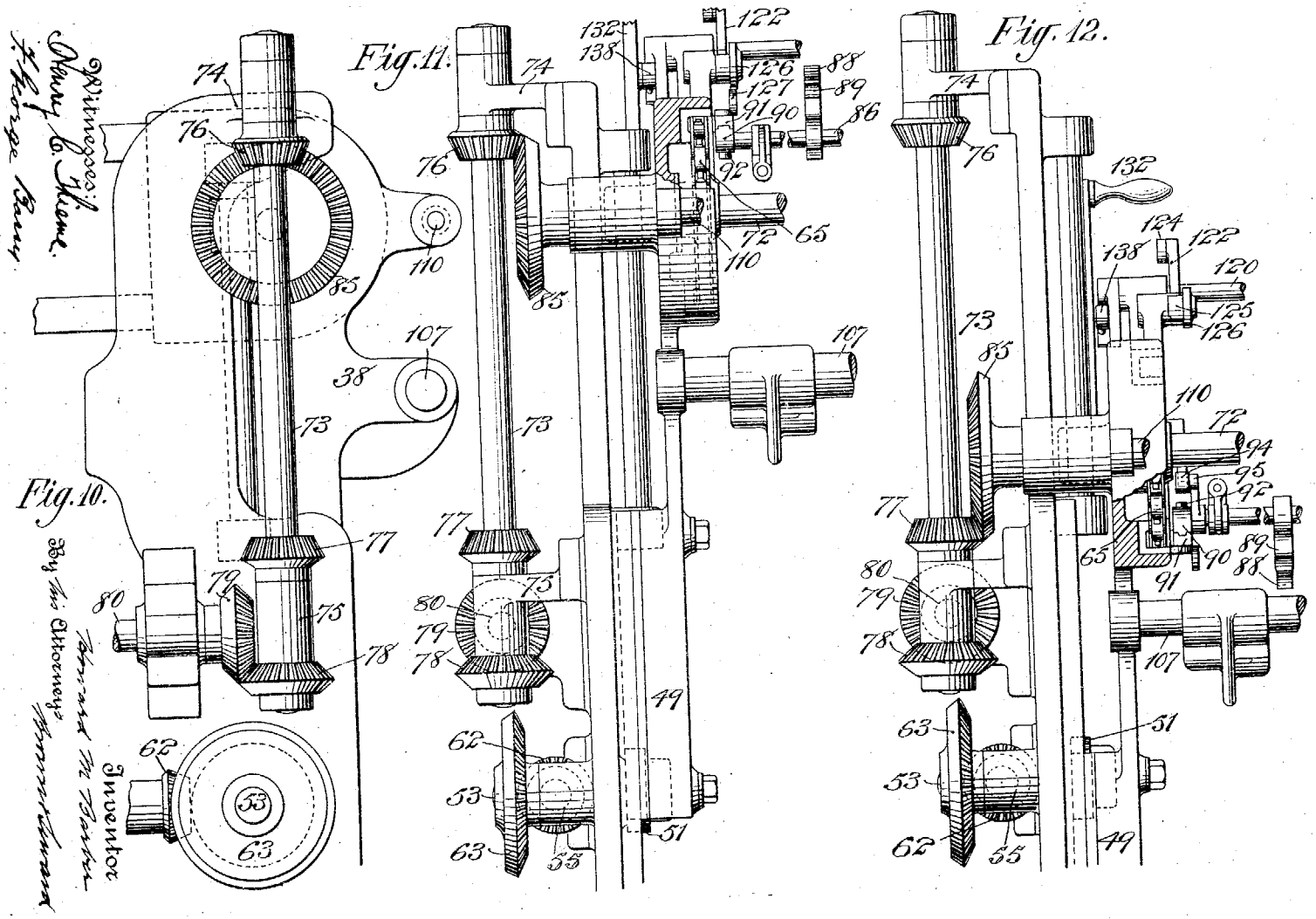
Witnesses:
Henry C. Thieme.
F. George Barry
Inventor
Howard M. Barber
By his Attorneys
Brown & Seward H. M. BARBER.
SHEET DELIVERY APPARATUS FOR PRINTING MACHINES.
APPLICATION FILED JULY 30, 1914.
Reissued Dec. 22, 1914.
13,850.
8 SHEETS—SHEET 8.
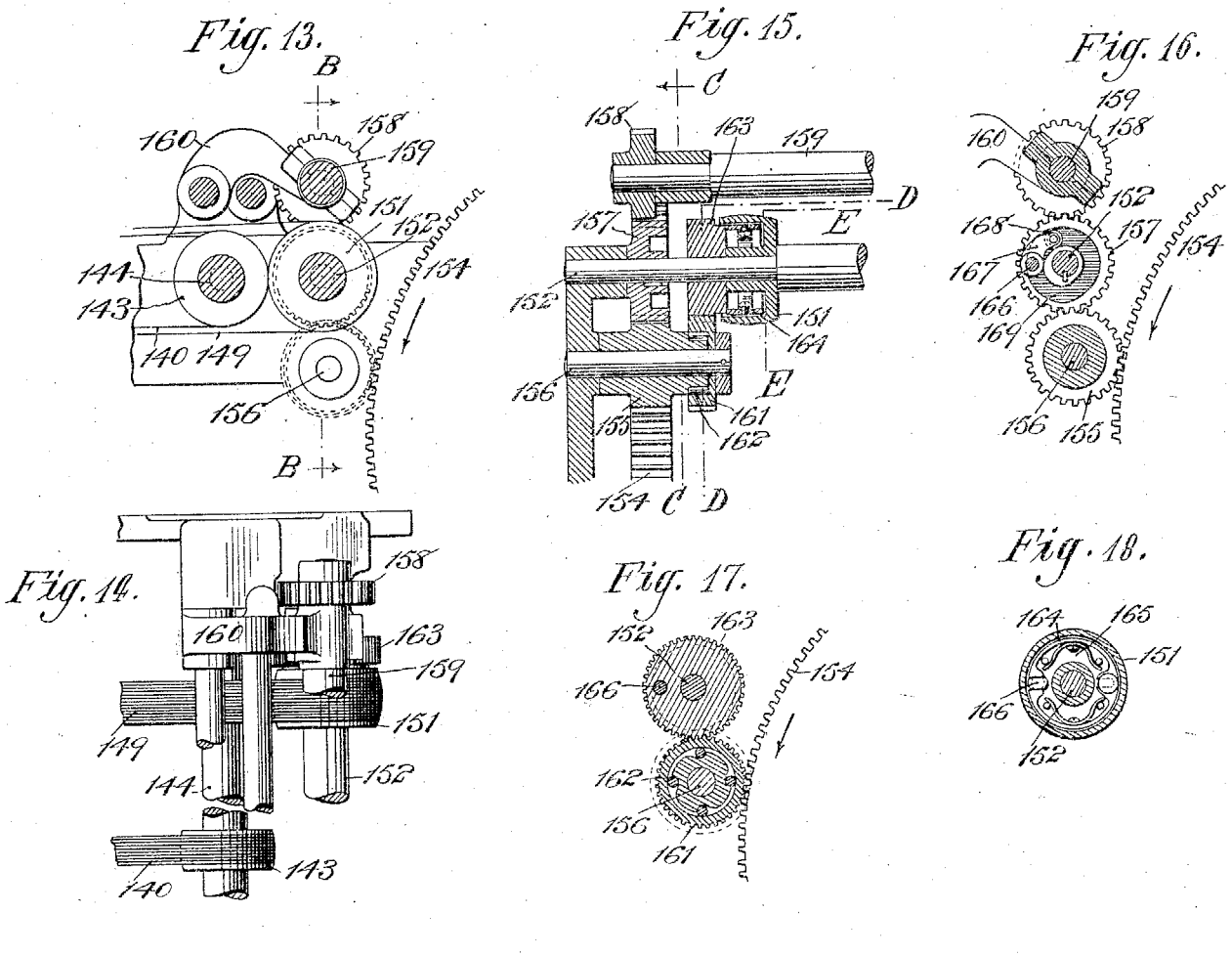
Witnesses:
Henry C. Thieme
F. George Baum
Inventor
Howard M. Barber
By his Attorneys
Brown & Lewis

UNITED STATES PATENT OFFICE.

HOWARD M. BARBER, OF STONINGTON, CONNECTICUT, ASSIGNOR, BY MESNE ASSIGNMENTS, TO C. B. COTTRELL AND SONS COMPANY, OF WILMINGTON, DELAWARE, A CORPORATION OF DELAWARE.

SHEET-DELIVERY APPARATUS FOR PRINTING-MACHINES.

13,850. Specification of Reissued Letters Patent. Reissued Dec. 22, 1914.

Original No. 1,094,048, dated April 21, 1914, Serial No. 500,878. Application for reissue filed July 30, 1914. Serial No. 854,181.

*To all whom it may concern:*

Be it known that I, HOWARD M. BARBER, a citizen of the United States, and resident of Stonington, in the county of New London and State of Connecticut, have invented new and useful Improvements in Sheet-Delivery Apparatus for Printing-Machines, of which the following is a specification.

The object of this invention is to provide certain improvements in the construction, form and arrangement of the several parts of a sheet delivery apparatus for printing machines whereby the sheets may be delivered either with their freshly printed sides up or with their freshly printed sides down as may be desired, without requiring the use of a fly and its operating mechanism.

This invention comprises a sheet delivery apparatus which includes an endless delivery carrier arranged to receive the sheets one side up and deliver them the same side up or the other side up as may be desired.

This invention further comprises means for driving the endless delivery carrier in either direction and means for feeding the sheets to the under side of the carrier when it is caused to travel outwardly, for depositing the sheets printed side up or for feeding the sheets to the upper side of the carrier when it is caused to travel outwardly, for depositing the sheets printed side down, the carrier grippers being made readily reversible and their operating cams being suitably arranged to insure the proper action of the grippers for receiving, conveying and depositing the sheets.

In the embodiment of the invention shown herein, the endless delivery carrier is raised and lowered to bring its grippers into the desired position to receive the sheets as they are fed to the under or upper side of the carrier.

The means for feeding the sheets to the endless delivery carrier of the sheet delivery apparatus shown herein comprises an intermittently driven endless tape carrier, the top side of which runs ahead when receiving the sheets from the press for presenting the sheets to the carrier grippers. As the carrier grippers close down upon the sheet, the tape carrier ceases to travel and it remains at rest while the sheet is being drawn outwardly by the carrier grippers.

The endless delivery carrier is herein shown as endless chains, which chains carry the bars of the carrier grippers, which gripper bars may be reversed so as to present the grippers properly as the movement of the carrier is reversed.

In the accompanying drawings, the invention is shown in connection with a two-revolution cylinder printing machine, but it is to be understood that it may be applied to printing machines of any type.

Figure 2:
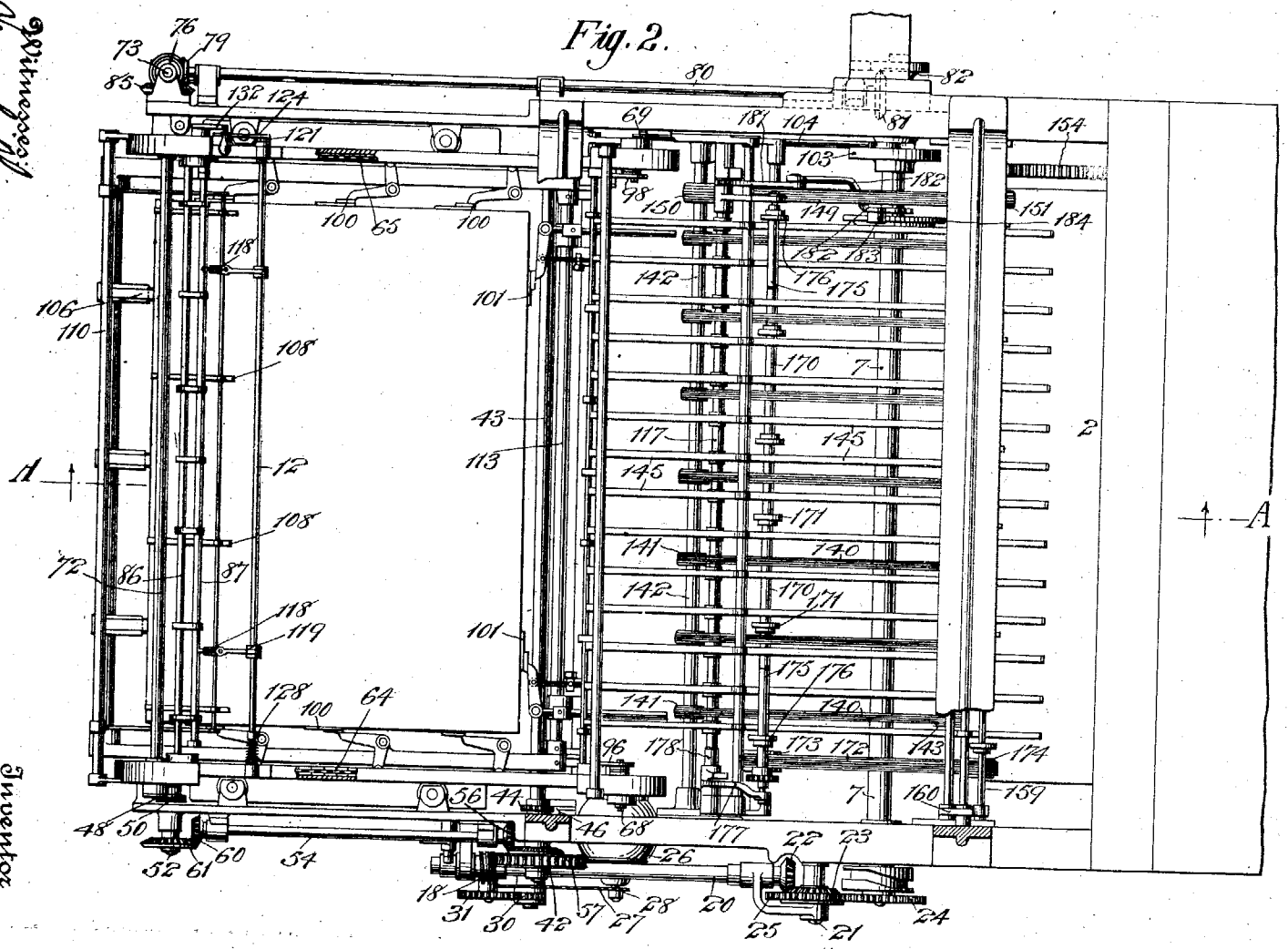
Figure 3:
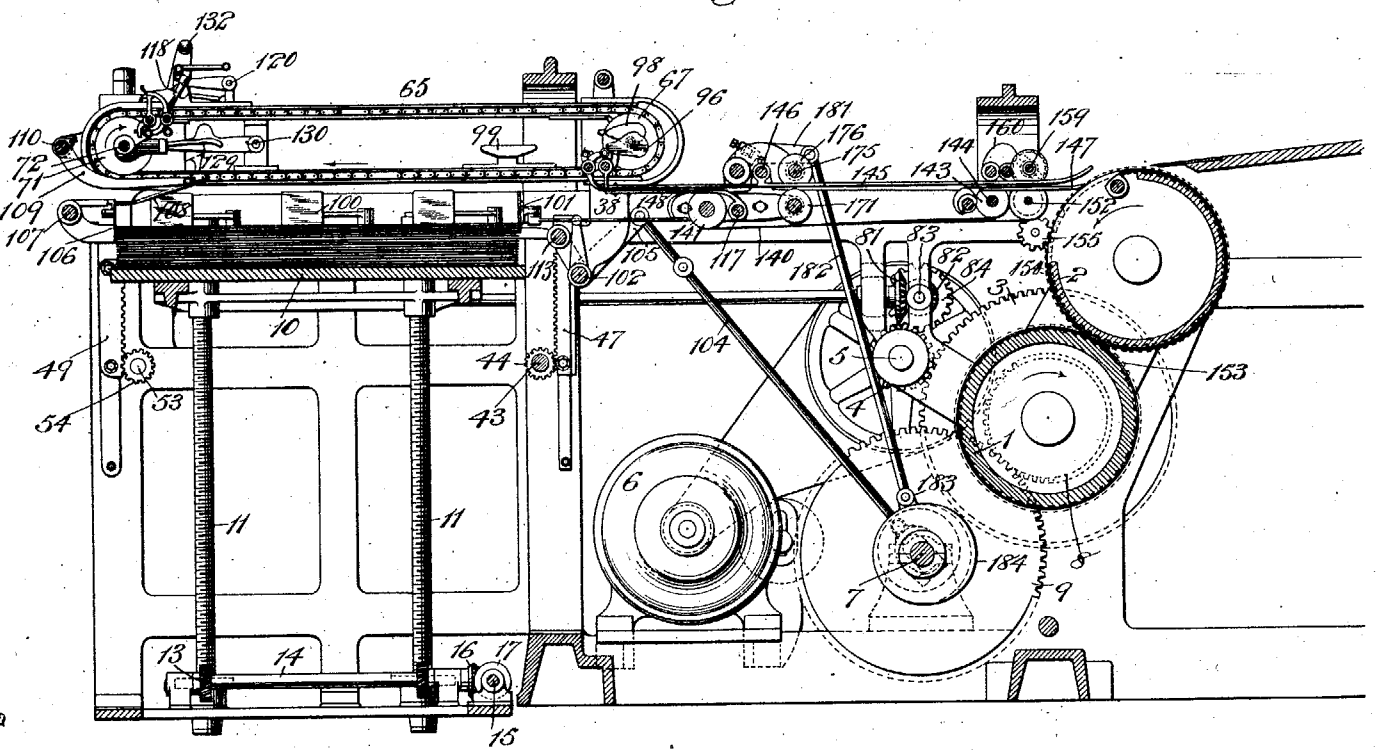
Figure 4:
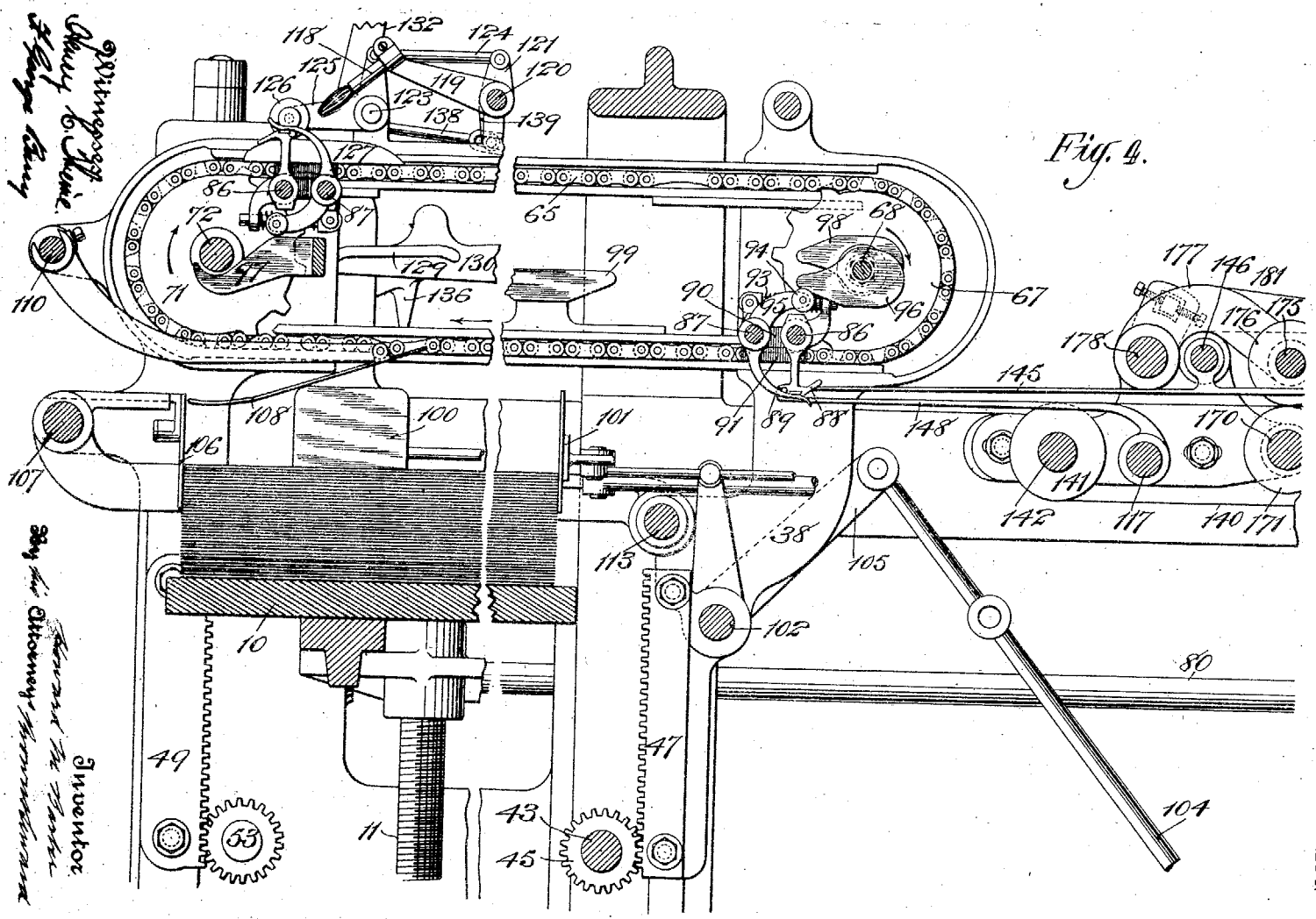
Figure 9:
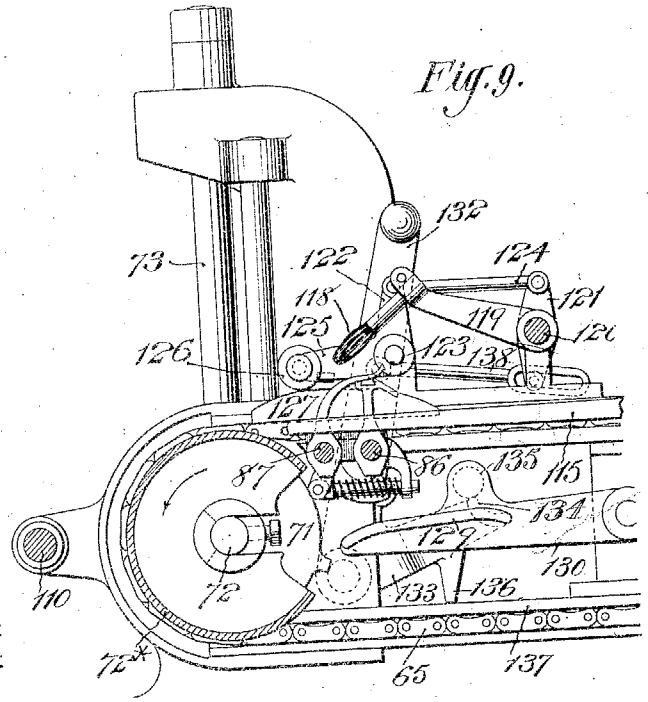
Figure 7:
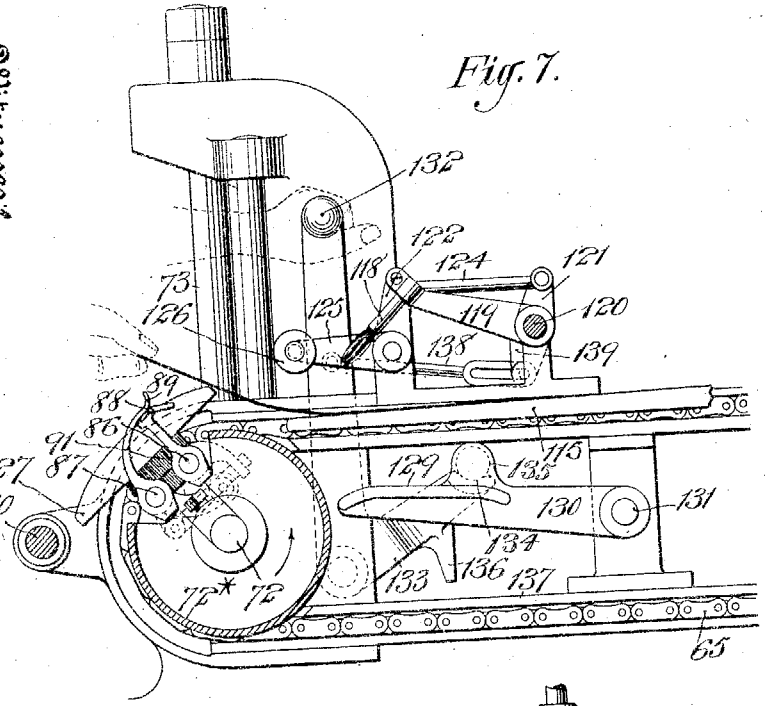
Figure 8:
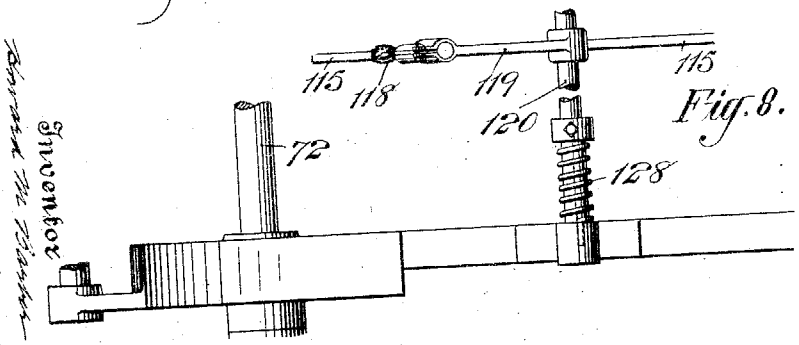

Figure 1 is a side view of portions of a two-revolution cylinder printing machine having applied thereto the improved sheet delivery apparatus, the parts being in the position which they assume when the under side of the endless delivery carrier is arranged to receive the sheet printed side up and convey it outwardly for depositing the same upon the table printed side up, Fig. 2 is a top plan view of the same, Fig. 3 is a longitudinal vertical section taken in the plane of the line A—A of Fig. 2, Fig. 4 is an enlarged detail section taken in the same plane, the grippers and their operating cams on the near side of the machine being left in position, Fig. 5 is a section similar to Fig. 4, showing the endless delivery carrier lowered for receiving the sheets upon its upper side, the upper side of the carrier being arranged to travel outwardly so that the sheets may be laid first outwardly along the upper side and then inwardly along the lower sides for depositing the sheets upon the table printed side down, Fig. 6 is a fragmentary section showing the grippers released for permitting the withdrawal of a sheet by hand as the sheet nears the outward limit of its movement along the upper side of the endless carrier, Fig. 7 is a detail section showing the position which the parts assume when a sheet is being withdrawn by hand from the delivery apparatus, Fig. 8 is a partial top plan view showing the spring for normally holding the sheet engaging brushes at the limit of their downward movement, Fig. 9 is a view similar to Fig. 7, showing the position of the parts when the cam for opening the grippers at the outer end of the endless carrier to permit the manual removal of a sheet, is moved out of its operative position, and showing the cam for raising the brushes to permit the passage of the advance edge of the sheet, in its operative position, Fig. 10 is a detail view in side elevation showing the driving gears for the endless delivery carrier arranged for moving the under side of the carrier outwardly where the sheet is to be deposited printed side up, Fig. 11 is a detail view in end elevation partially in section of the same, Fig. 12 is a detail end view partially in section showing the parts in the position which they assume when the endless carrier has been lowered for reversing the movement of the carrier to deposit the sheets printed side down, Fig. 13 is a detail section showing the gearing for imparting the intermittent movement to the endless tape carriers, Fig. 14 is a top plan view of the same, Fig. 15 is a section taken in the plane of the line B—B of Fig. 13, Fig. 16 is a section taken in the plane of the line C—C of Fig. 15, Fig. 17 is a section taken in the plane of the line D—D of Fig. 15, and Fig. 18 is a section taken in the plane of the line E—E of Fig. 15.

In the portion of the printing press herein shown, the form cylinder is denoted by 1 and its impression cylinder by 2. The form cylinder gear 3 is driven from a gear 4 on the drive shaft 5, which shaft is driven from a suitable motor 6. The cam shaft 7 is driven from the form cylinder 1 through the gears 8 and 9. The sheet receiving table 10 is supported upon four screws 11 having worm and gear connections 12 and 13 with shafts 14 driven from a cross shaft 15 by a bevel gear connection 16, 17. This cross shaft 15 has a worm and gear connection 18, 19, with a shaft 20, the latter being driven from a shaft 21 by a bevel gear connection 22, 23, the said shaft 21 being driven from the cam shaft 7 by gears 24, 25. This train of gearings serves to gradually lower the table as the sheets are deposited thereon for keeping the top of the pile of sheets at the required distance from the sheet delivery apparatus to be hereinafter described. The table may be rapidly raised or lowered by driving the shaft 15 from a motor 26, sprocket chain and wheels 27, 28, 29, and gear 30, meshing with the gear 31 on the shaft 15. When this is done, the worm 18 is disconnected by either the hand lever 32 or the foot lever 33 and their connections 34, 35, 36 and 37.

A supplemental frame 38 is located within the side framing of the machine, which supplemental frame forms the support for the sheet delivery apparatus and may be raised and lowered by the following means:—A worm shaft 39 is mounted in a bracket 40 on the side framing of the machine, to which shaft a handle may be attached for manually rotating the same. This shaft has a worm and gear connection 41, 42, with a cross shaft 43, which is provided with pinions 44, 45, meshing with vertical racks 46, 47, respectively, at the inner ends of the supplemental frame 38. Corresponding vertical racks 48, 49, at the outer end of the supplemental frame 38 are engaged by pinions 50, 51, on stud shafts 52, 53, which are driven from the cross shaft 43 through shafts 54, 55, having bevel gear connections 56, 57, and 58, 59, respectively, with the shaft 43, and bevel gear connections 60, 61, and 62, 63, respectively, with the stud shafts 52, 53.

The side chains 64, 65, of the endless sheet delivery carrier pass around sprockets 66, 67, mounted on stud shafts 68, 69, at the inner end of the carrier and around sprocket wheels 70, 71, mounted on a cross shaft 72 at the outer end of the carrier. These shafts 68, 69, and 72 are all mounted in the supplemental frame 38 so that as the frame is raised and lowered the carrier will also be raised and lowered. This carrier is driven in either direction by the following means:—A vertical shaft 73 is mounted in suitable brackets 74, 75, on the side framing of the machine, which shaft has fixed thereto upper and lower oppositely arranged bevel gears 76, 77. This vertical shaft 73 is further provided with a bevel gear connection 78, 79, with a horizontal shaft 80, which, in turn, has a bevel gear connection 81, 82, with a stud shaft 83, which shaft 83 is driven from the drive shaft 5 through gears 4, 84. The front carrier shaft 72 is provided with a bevel gear 85 which is brought into mesh with the upper gear 76 on the vertical shaft 73 when the carrier and its supplemental frame are raised to the limit of their upward movement. The arrangement of the drive is such that when the parts are thus connected the under side of the endless carrier will be moved outwardly. This bevel gear 85 is brought into mesh with the lower bevel gear 77 on the vertical shaft 73 when the carrier and its supplemental frame are lowered to the limit of their downward movement. The arrangement of the drive is then such that the upper side of the endless carrier will be moved outwardly.

The endless delivery carrier may be provided with one or more sets of sheet grippers in the present instance two of these sets of grippers are shown. Each set of grippers is reversible by turning their bars 86, 87, end for end, so as to present the jaws 88, 89, of the grippers in the proper direction for receiving the sheets as they are fed to the carrier. When the carrier is to be used in its raised position for delivering the sheets the same side up as they are received, the grippers are arranged to receive the sheets as they are fed to the under side of the carrier and when the carrier is lowered for receiving the sheets one side up and deliver them the other side up, the grippers are arranged to receive the sheets on the upper side of the carrier. These gripper supporting bars are provided at their ends with blocks 90 which are removably attached to blocks 91 carried by the chains 64, 65, the fastening devices in the present instance, being bolts 92. The jaw 88 of each set of grippers is stationary and the jaw 89 is movable and is held yieldingly closed by a spring 93.

A cam roller 94 is carried by an arm 95 fixed to the bar 87 at one end thereof, which cam roller is arranged to engage either of two sets of stationary cams according to the direction of travel of the endless carrier. When the set of grippers is arranged for receiving the sheets at the under side of the carrier, the cam roller 94 is fitted to engage a stationary cam 96 on the stud shaft 68 for causing the grippers to open for receiving the advance edge of the sheet. As the grippers travel outwardly along the underside of the carrier, the cam roller 94 is engaged by a cam 97 for causing the grippers to open to deposit the sheet the same side up that it was received by them. When the direction of travel of the endless carrier is reversed the reversal of the gripper bars will bring the cam roller 94 of each set of grippers to the other side of the carrier in position to engage a stationary cam 98 on the stud shaft 69 for opening the grippers to receive the advance edge of the sheet at the upper side of the carrier. After the grippers, with their attached sheet, have passed outwardly along the upper side of the carrier, thence downwardly and inwardly along the under side of the carrier to a predetermined point, the cam roller 94 will engage the stationary cam 99 for opening the grippers to permit the deposit of the sheet, the opposite side up from the way the sheet was received by the grippers.

The jogging mechanism for truing up the sheets as they are deposited onto the table 10 may be of any well known or approved construction. In the present instance, the side joggers 100 and end joggers 101 are operated through suitable connections from a rock shaft 102, which rock shaft in turn is operated from a cam 103 on the shaft 7 through a connecting rod 104, the upper end of which is attached to an arm 105 of the rock shaft 102. Stops 106 for the outer ends of the sheets are carried by a cross bar 107.

Removable sheet guards are provided for insuring the proper deposit of the sheets upon the pile according to the direction in which the endless carrier is traveling for delivering the sheets either printed side up or printed side down. When the sheets are fed to the under side of the carrier for delivering them the same side up which in this instance is the printed side up, one or more downwardly and outwardly inclined sheet guard fingers 108 are provided, which fingers are secured to the inner ends of inwardly projecting arms 109 removably secured to the cross bar 110. When the sheets are fed to the upper side of the carrier for deposit upon the pile, the reverse side up or printed side down, one or more downwardly and inwardly extending sheet guard fingers 111 are provided, which fingers are adjustably supported in brackets 112 removably secured to the cross shaft 113. In this arrangement, sheet stops 114 are provided for the inner ends of the sheets, which sheet stops are supported from the guard fingers 111. One or more removable sheet supporting fingers 115 are also removably engaged at their inner ends with brackets 116 clamped to the cross bar 117, said fingers extending along in substantially the plane of the upper side of the endless carrier to a point adjacent to the outer end of the endless carrier. A cylinder 72* is also removably secured upon the outer shaft 72 of the endless carrier, over which cylinder the sheets are caused to travel. When the sheets are fed to the under side of the endless carrier for delivery, the same or printed side up, these fingers 115 are removed.

For preventing the sheets from displacement when they are fed to the upper side of the carrier and passed around the outer end of the carrier for delivery reverse side up or printed side down, one or more retarding brushes 118 are provided arranged in the same vertical plane as the fingers 115 and arranged to press the sheet onto the said fingers. These retarding brushes are raised to permit the advance edges of the sheets to pass beneath the same by the following mechanism:—The brushes are mounted in the free ends of arms 119 fixed to a rock shaft 120. One arm 121 of this rock shaft 120 is connected to one arm 122 of a rock shaft 123 by a connecting rod 124 and another arm 125 of the rock shaft 123 is provided with a cam roller 126 which is arranged in position to be lifted by a cam 127 carried by the endless chain 65 at each set of grippers. The raising of this roller 126 will also raise the retarding brushes 118. A spring 128 tends to hold the brushes down in engagement with the sheet.

For permitting the manual removal of the sheet for inspection or for other purposes as it is passing along the upper side of the endless carrier, I provide a movable cam 129 on an arm 130 pivoted at 131, which arm may be raised for bringing the cam 129 into position to engage the gripper cam roller 94 for opening the grippers as the sheet nears the limit of its outward movement. The device which I have shown for accomplishing this result comprises a hand lever 132 having an arm 133, the free end of which is provided with a recess 134 for receiving a stud 135 on the cam arm 130 when the hand lever 132 has been moved into position to raise the cam 129 so that the cam will be retained in its raised position against unintentional displacement. A stop 136 on the arm 133 rests upon one of the chain guards 137 when the gripper tripping device is out of operation. The retarding brushes 118 are also raised at the same time that the cam 129 is raised by providing a lost motion connecting rod 138 secured at its outer end to the hand lever 132 and having a pin and slot connection at its inner end with the arm 139 of the rock shaft 120. This lost motion connection between the hand lever 132 and the retarding brush mechanism permits the operation of the retarding brushes when the sheet releasing mechanism is out of operation.

The means for conveying the sheets from the impression cylinder of the printing machine to the sheet delivery carrier is constructed, arranged and operated as follows:—The intermittently driven tape carrier comprises the tapes 140 which pass around pulleys 141 on the rotary shaft 142 at their outer ends and around pulleys 143 on the shaft 144 at their inner ends. The sheets as they leave the impression cylinder 2 pass over the tapes 140 and under the sheet guides 145 supported from the cross bar 146. These sheets, as they leave the impression cylinder 2, also pass over the stripper fingers 147 and as they leave the outer end of the endless tape carrier they pass between the guide fingers 148 and the sheet guides 145.

The endless tape carrier is driven intermittently whereby the tape carrier is caused to travel outwardly to convey the advance edge of the sheet to the grippers on the delivery carrier. The travel of the tapes then ceases as the grippers close upon the leading edge of the sheet thus permitting the sheets to be drawn from the tapes at a much less surface speed than the normal speed of the tapes without compelling the sheet being fed ahead to cause the middle or rear end of the sheet to drag upon the sheet previously deposited upon the receiving table. This intermittent travel is imparted to the tape carrier by any well known or approved mechanism, such, for instance as that shown, described and claimed in applicant's United States Letters Patent No. 757,248 dated April 12, 1904, a brief description of which follows:—An endless belt 149 passes around a pulley 150 on the shaft 142 and around a pulley 151 loosely mounted on the shaft 152. The form cylinder gear 153 drives the impression cylinder gear 154, which, in turn, drives the gear 155 on the stud axle 156. This gear 155 meshes with a gear 157 keyed to the shaft 152. This gear 157 meshes with a gear 158 fixed to the shaft 159 mounted in the bracket 160. A gear 161 is loosely mounted on the stud axle 156 and a roller clutch 162 is interposed between this gear 161 and the hub of the gear 155 so that the gear 161 is driven with the gear 155. The gear 161 meshes with a gear 163 loosely mounted on the shaft 152. The gears 155 and 157 have an equal number of teeth, but the gear 161 has a lesser number of teeth than the gear 163. The said gear 163 carries on its outer face a clutch 164 in the form of a divided elastic ring, which clutch is received in an annular groove 165 in the driving pulley 151.

For expanding the clutch ring 164 for coupling the pulley 151 to the gear 163 there is inserted through the gear 163, a pin 166 which has a flattened head located between the ends of the divided clutch ring, as clearly shown in Fig. 18. This pin 166 is rocked by providing it with an arm 167 having a stud roller 168 located in a cam groove 169 in the gear 157. The shape of this cam groove 169 is such that the pulley 151 will be clutched to the gear 163 at the desired intervals for obtaining an intermittent movement of the endless tape carrier. This pulley 151, when clutched to the gear 163, is driven at a slower speed than the gears 155, 157, 158, because of the gear 161 having a lesser number of teeth than the gear 163.

The driving mechanism for the several parts, as illustrated, is so arranged that the endless tape carrier travels at the surface speed of the impression cylinder and at a speed one and one-half times faster than the endless delivery carrier.

A positive sheet forwarding device is provided for engaging the sheet on the endless tape carrier before it is released by the feeding rollers at the impression cylinder, which sheet forwarding device comprises rollers driven at the speed of the impression cylinder and endless tape carrier, arranged to engage the opposite sides of the sheet for feeding the sheet to the grippers on the delivery carrier at the speed of the endless tape carrier. This sheet forwarding device is constructed, arranged and operated as follows:—The cross shaft 170 which carries the lower set of feeding rollers 171 of the retarding mechanism, is driven from the shaft 152 through a belt and pulley connection 172, 173, 174, the relative sizes of the pulleys 173 and 174 being such that the rollers 171 will be driven at the same surface speed as the impression cylinder and endless tape carrier. The upper cross shaft 175 which bears the drop rollers 176 is carried by the arms 177 of a rock shaft 178. The shaft 175 is provided with a spur gear 179 which is in mesh at all times with a spur gear 180 on the shaft 170 as the shaft 175 is lowered and raised.

The sheet forwarding device is operated to release the sheet as the advance edge reaches and is grasped by the delivery carrier grippers, by the following means: The arm 181 of the rock shaft 178 is attached to the upper end of a rod 182, the lower end of which rod is provided with a stud roller 183 engaged by a cam 184 on the cam shaft.

It is to be understood that suitable means not herein shown are employed for insuring the delivery of the sheets from the impression cylinder grippers between the guides 145 and stripper fingers 147 onto the endless tape carrier.

In operation, when the sheets are to be deposited upon the table 10 printed side up, the supplemental frame 38 which carries the endless delivery carrier, the retarding brush mechanism and the joggers, is raised to bring the under side of the delivery carrier into position to receive the sheets from their feeding mechanism, the sets of grippers being secured to the carrier chains in position to open toward the advancing sheet. The sheet guard fingers 108 with their arms 109 may then be secured in position by attaching the arms to the cross bar 110. As the supplemental frame 38 is raised, the gear 85 will be brought into mesh with the gear 76 on the vertical shaft 73, thus causing the delivery carrier to be driven in a direction to cause the under side thereof to move outwardly away from the tape carrier. When the parts are in this position, the cam roller of each set of grippers is in position to be engaged by the cam 96 for opening the grippers to receive the advance edge of the sheet and to be engaged by the cam 97 for opening the grippers to deposit the sheet upon the table. When it is desired to deliver the sheets the printed side down, the supplemental frame 38 is lowered for bringing the upper side of the delivery carrier into position to receive the sheets from the tape carrier. As the supplemental frame 38 is lowered, it will bring the bevel gear 85 into mesh with the bevel gear 77, thus reversing the movement of the delivery carrier. The delivery gripper supporting bars are turned end for end and secured in their reverse position on the delivery carrier chains for bringing the gripper jaws into position to open toward the advancing sheet. This reversal of the gripper bars will bring the gripper cam 4 of each set of grippers into position to be engaged by the stationary cam 98 at the inner end of the carrier for opening the grippers to receive the sheet and to be engaged by the stationary cam 99, as the sheets are moved inwardly along the under side of the carrier for depositing the sheets upon the table. In this case, the guard fingers 108 and their arms 109 are removed and in lieu thereof the sheet guard fingers 111 and the sheet stops 114 are inserted into position by attaching their supporting bracket 112 to the cross bar 113. The sheet supporting fingers 115 are also placed in position along the upper side of the delivery carrier and the turning cylinder 72* is secured on the shaft 72. As the advance edges of the sheet approach the retarding brushes 118, the cam 127 on the carrier chain 65 will raise the brushes 118 by its engagement with the roller 126.

If it is desired to manually remove a sheet for inspection or for other purposes, the hand lever 132 is rocked into position to raise the cam 129 into position to engage the gripper cam roller 94 to cause the grippers to release the advance edge of the sheet.

The intermittent operation of the endless tape carrier is the same whether the sheets are delivered to the under side of the delivery carrier or to the upper side thereof and is as follows:—As the sheet is deposited onto the endless tape carrier from the impression cylinder, the tape carrier is driven outwardly at the surface speed of the impression cylinder until the advance edge of the sheet is fed into position to be engaged by its set of grippers on the delivery carrier. As the delivery carrier grippers close down upon the sheet, the travel of the tapes in the tape carrier ceases and the tapes remain at rest while the sheet is being carried out on the delivery carrier. This will permit the sheet to be drawn from the tapes at a much less surface speed than the normal speed of the tapes, the delivery carrier being run at a slower speed than the tape carrier. In both of the above operations, the endless tape carrier is so operated that it will be moved forwardly to bring the advance edges of a sheet into position to be engaged by the rollers of the sheet forwarding device. The sheet forwarding device will then be caused to feed the sheets forward into position to be engaged by the delivery carrier grippers. The movement of the tape carrier is then stopped and the rollers of the sheet forwarding device are released as the delivery carrier grippers close on the sheet for conveying the same into position to be deposited upon the receiving table.

When the sheets are being delivered printed side down, there is a tendency to give the sheets an increased speed as the delivery grippers make the turn around the outer end of the carrier. To counteract this disturbance, the turning cylinder 72* is made to nearly coincide with the pitch line of the sprocket and the retarding brushes 118 are lowered so as to produce a drag upon the sheets, by holding the sheets down on the fingers 115.

What I claim is:

1. In a sheet delivery apparatus for printing machines, a vertically adjustable endless delivery carrier and an intermittently driven tape carrier for feeding sheets one side up thereto, said delivery carrier being arranged to deliver the sheets the same side up or the other side up.

2. In a sheet delivery apparatus for printing machines, a vertically adjustable endless delivery carrier and an intermittently driven endless tape carrier for feeding sheets thereto printed side up, the said delivery carrier being arranged to deliver the sheets printed side up or printed side down.

3. In a sheet delivery apparatus for printing machines, a vertically adjustable endless delivery carrier, means for reversing the direction of travel of the same, and an intermittently driven endless tape carrier for feeding sheets to the delivery carrier.

4. In a sheet delivery apparatus for printing machines, a vertically adjustable endless delivery carrier, including reversible grippers, means for reversing the direction of travel of the carrier and an intermittently driven endless tape carrier for feeding sheets to the said grippers.

5. In a sheet delivery apparatus for printing machines, a vertically adjustable endless delivery carrier, means for reversing the direction of travel of the same and an intermittently driven endless tape carrier for feeding sheets to the under or upper side of said delivery carrier.

6. In a sheet delivery apparatus for printing machines, a vertically adjustable endless delivery carrier including reversible grippers, means for reversing the direction of travel of the carrier and an intermittently driven endless tape carrier for feeding sheets to the grippers at the under or upper side of the delivery carrier.

7. In a sheet delivery apparatus for printing machines, an endless delivery carrier, means for reversing the direction of travel of the same, an intermittently driven endless tape carrier for feeding sheets to the delivery carrier and means for raising and lowering the delivery carrier whereby the sheets are received at the under side or upper side thereof.

8. In a sheet delivery apparatus for printing machines, an endless delivery carrier including reversible grippers, means for reversing the direction of travel of the delivery carrier, an intermittently driven endless tape carrier for feeding sheets to the said grippers and means for raising and lowering the delivery carrier whereby the grippers may receive the sheets at the under or upper side thereof.

9. In a sheet delivery apparatus for printing machines, an endless delivery carrier arranged to receive the sheets one side up and deliver them the other side up and a manually operated device for releasing a sheet from the carrier at pleasure to permit the withdrawal of the sheet.

10. In a sheet delivery apparatus for printing machines, an endless delivery carrier arranged to receive the sheets printed side up and deliver them printed side down and a manually operated device for releasing a sheet from the carrier at pleasure to permit the withdrawal of the sheet.

11. In a sheet delivery apparatus for printing machines, an endless delivery carrier arranged to receive the sheets one side up and deliver them the same side up or the other side up and a manually operated device for releasing a sheet from the carrier at pleasure to permit the withdrawal of the sheet.

12. In a sheet delivery apparatus for printing machines, an endless delivery carrier arranged to receive the sheets printed side up and deliver them printed side up or printed side down and a manually operated device for releasing a sheet from the carrier at pleasure to permit the withdrawal of the sheet.

13. In a sheet delivery apparatus for printing machines, an endless delivery carrier having grippers, means for feeding sheets to the grippers and a manually operated device for opening the grippers at a predetermined point in the movement of the carrier to permit the withdrawal of a sheet.

14. In a sheet delivery apparatus for printing machines, an endless delivery carrier arranged to receive the sheets one side up and deliver them the other side up, a retarding device engaging the sheets for retaining them in position as they pass around the outer end of the carrier and means for automatically raising the retarding device to permit the passage of the advance edge of the sheet.

15. In a sheet delivery apparatus for printing machines, an endless delivery carrier arranged to receive the sheets one side up and deliver them the other side up, a retarding device engaging the sheets for retaining them in position as they pass around the outer end of the carrier and a cam on the carrier for raising the retarding device to permit the passage of the advance edge of the sheet.

16. In a sheet delivery apparatus for printing machines, an endless delivery carrier driven at a certain speed, a sheet feeding endless tape carrier driven at a greater speed and a positive sheet forwarding device arranged to engage and release the sheet as it is fed to the delivery carrier.

17. In a sheet delivery apparatus for printing machines, an endless delivery carrier driven at a certain speed, a sheet feeding endless tape carrier driven intermittently at a greater speed and a positive sheet forwarding device arranged to engage and release the sheet as it is fed to the delivery carrier.

BEST AVAILABLE COPY

18. In a sheet delivery apparatus for printing machines, an endless delivery carrier driven at a certain speed, means for reversing the direction of travel of the delivery carrier, an endless tape carrier driven at a greater speed for feeding the sheets to the upper or under side of the delivery carrier and a positive sheet forwarding device arranged to engage and release the sheet as it is fed to the delivery carrier.

19. In a sheet delivery apparatus for printing machines, an endless delivery carrier driven at a certain speed, means for reversing the direction of travel of the delivery carrier, an endless tape carrier driven intermittently at a greater speed than the delivery carrier for feeding the sheets to the upper or under side thereof and a positive sheet forwarding device arranged to engage and release the sheet as it is fed to the delivery carrier.

20. In a sheet delivery apparatus for printing machines, an endless delivery carrier driven at a certain speed, a sheet feeding endless tape carrier driven at a greater speed and a positive sheet forwarding device arranged to engage and release the sheet as the advance edge of the sheet is engaged by the delivery carrier.

21. In a sheet delivery apparatus for printing machines, an endless delivery carrier driven at a certain speed, a sheet feeding endless tape carrier driven intermittently at a greater speed and a positive sheet forwarding device arranged to release the sheet as the advance edge of the sheet is engaged by the delivery carrier.

22. In a sheet delivery apparatus for printing machines, an endless delivery carrier driven at a certain speed, delivery carrier grippers, a sheet feeding endless tape carrier driven at a greater speed and a positive sheet forwarding device arranged to release the sheet as the advance edge of the sheet is engaged by the delivery carrier grippers.

23. In a sheet delivery apparatus for printing machines, an endless delivery carrier driven at a certain speed, delivery carrier grippers, a sheet feeding endless tape carrier driven intermittently at a greater speed and a positive sheet forwarding device arranged to release the sheet as the advance edge of the sheet is engaged by the delivery carrier grippers.

24. In a sheet delivery apparatus for printing machines, an endless delivery carrier driven at a certain speed, a sheet feeding endless tape carrier driven at a greater speed and a positive sheet forwarding device driven at the speed of the tape carrier arranged to engage and release the sheet as it is fed to the delivery carrier.

25. In a sheet delivery apparatus for printing machines, an endless delivery carrier driven at a certain speed, a sheet feeding endless tape carrier driven intermittently at a greater speed and a positive sheet forwarding device driven at the speed of the tape carrier, arranged to engage and release the sheet as it is fed to the delivery carrier.

26. In a sheet delivery apparatus for printing machines, an endless delivery carrier driven at a certain speed, a sheet feeding endless tape carrier driven at a greater speed and a positive sheet forwarding device driven at the speed of the tape carrier, arranged to release the sheet as the advance edge of the sheet is engaged by the delivery carrier.

27. In a sheet delivery apparatus for printing machines, an endless delivery carrier driven at a certain speed, a sheet feeding endless tape carrier driven intermittently at a greater speed and a positive sheet forwarding device driven at the speed of the tape carrier, arranged to release the sheet as the advance edge of the sheet is engaged by the delivery carrier.

28. In a sheet delivery apparatus for printing machines, a sheet delivery device, a sheet feeding endless tape carrier and a positive sheet forwarding device located intermediate the ends of the tape carrier and driven at the speed of the tape carrier for feeding the sheets into position to be engaged by the delivery device.

29. In a sheet delivery apparatus for printing machines, a sheet delivery device, an intermittently driven sheet feeding endless tape carrier and a positive sheet forwarding device located intermediate the ends of the endless tape carrier and arranged to engage and release the sheet as it is fed to the delivery device.

30. In a sheet delivery apparatus for printing machines, a sheet delivery device, an intermittently driven sheet feeding endless tape carrier and a positive sheet forwarding device driven at the speed of the tape carrier arranged to engage the sheet for feeding it into position to be engaged by the delivery device.

31. In a sheet delivery apparatus for printing machines, an endless delivery carrier, a sheet feeding endless tape carrier and a positive sheet forwarding device arranged to engage the sheet for feeding it into position to be engaged by the delivery carrier and means for stopping the movement of the tape carrier and disengaging the sheet forwarding device from the sheet as the sheet is engaged by the delivery carrier.

32. In a sheet delivery apparatus for printing machines, an endless delivery carrier, means for reversing the direction of travel of the carrier, a sheet feeding endless tape carrier, a positive sheet forwarding device arranged to engage the sheet for feeding it into position to be engaged by the delivery carrier and means for stopping the movement of the tape carrier and disengaging the sheet forwarding device from the sheet as the sheet is engaged by the delivery carrier.

In testimony, that I claim the foregoing as my invention, I have signed my name in presence of two witnesses, this twentieth day of July, 1914.

HOWARD M. BARBER.

Witnesses:

A. R. STILLMAN,

E. M. GRANT.